(12) United States Patent
Hansen

(10) Patent No.: US 10,776,450 B1
(45) Date of Patent: Sep. 15, 2020

(54) CLOSED FORM ESTIMATOR FOR BALLISTIC MISSILE FLIGHT

(71) Applicant: Jeremiah J. Hansen, Spotsylvania, VA (US)

(72) Inventor: Jeremiah J. Hansen, Spotsylvania, VA (US)

(73) Assignee: United States of America, as represented by the Secretary of the Navy, Arlington, VA (US)

( * ) Notice: Subject to any disclaimer, the term of this patent is extended or adjusted under 35 U.S.C. 154(b) by 239 days.

(21) Appl. No.: 15/670,150

(22) Filed: Aug. 7, 2017

Related U.S. Application Data

(60) Provisional application No. 62/400,000, filed on Sep. 26, 2016.

(51) Int. Cl.
*G06F 17/13* (2006.01)
*F41G 7/00* (2006.01)
*F41H 11/02* (2006.01)

(52) U.S. Cl.
CPC ............ *G06F 17/13* (2013.01); *F41G 7/006* (2013.01); *F41H 11/02* (2013.01)

(58) Field of Classification Search
None
See application file for complete search history.

(56) References Cited

U.S. PATENT DOCUMENTS

| 8,358,238 B1* | 1/2013 | Friedman | F41G 7/30 244/3.1 |
|---|---|---|---|
| 8,650,000 B2 | 2/2014 | Africa, Jr. et al. | 702/141 |
| 2014/0067312 A1 | 3/2014 | Africa, Jr. | 702/141 |

OTHER PUBLICATIONS

Isaacson et al. "Estimation and Prediction of Ballistic Missile Trajectories", 1996, 94 pages. (Year: 1996).*
Regan et al. "Dynamics of Atmospheric Re-Entry", 1993, 54 pages. (Year: 1993).*
E. A. Ustinov: "Aerodynamics of Trans-Atmospheric Vehicles: A Non-Dimensional Approach", AIAA 2006-1039 https://trs.jpl.nasa.gov/bitstream/handle/2014/40092/05-4008.pdf?sequence=1&isAllowed=y.
G. P. Sutton: *Rocket Propulsion Elements*, John Wiley (1949) pp. 27-32.

\* cited by examiner

*Primary Examiner* — Suzanne Lo
(74) *Attorney, Agent, or Firm* — Gerhard W. Thielman

(57) ABSTRACT

A computer-implemented analysis method is provided for determining range of a ballistic missile for inclusion into a retaliatory targeting system. The method includes receiving and initializing input variables of the missile; calculating constants from the missile; determining completion of boost interval calculations; determining burnout parameters: velocity, flight path angle, and ground range at completion of boost interval for multiple stages; calculating orbital range from the burnout constraints; determining reentry intervals from which to calculate velocity and reentry range; summing boost, orbital, and reentry range values upon interval completion; and summing boost, orbital, and reentry times upon interval completion.

4 Claims, 2 Drawing Sheets

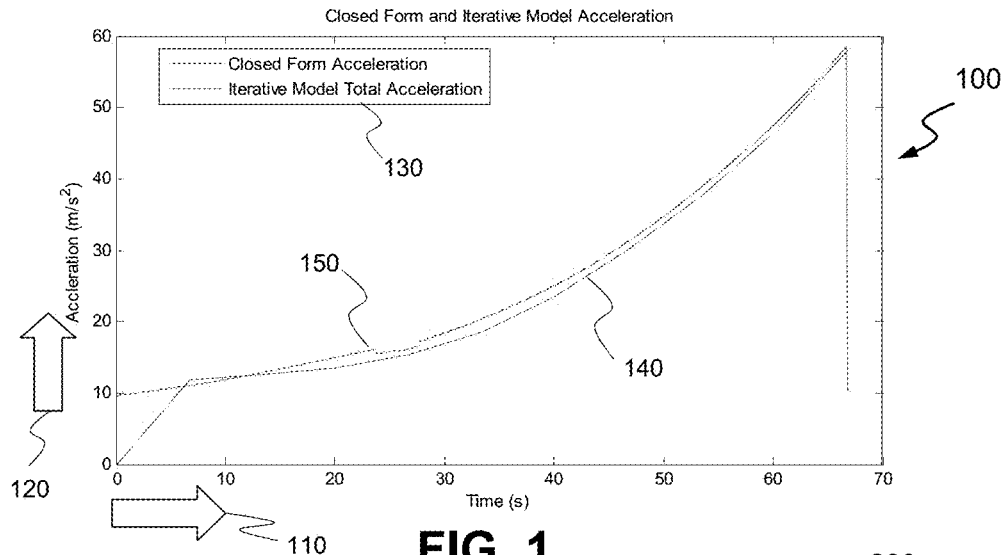

FIG. 1

| Component | Value (V-2) | Unit | Description |
|---|---|---|---|
| $H$ | 6,700 | meters (m) | height above surface |
| $\rho_0$ | 1.752 | kg/(m³) | density of air at sea level |
| $C_D$ | 0.26 | | coefficient of drag (scale value), dimensionless |
| $S$ | 2.85 | m² | reference area |
| $h_0$ | 0.0 | m | initial height |
| $V_0$ | 0.0 | m/s | initial velocity |
| $k$ | 1.38E−23 | J/K | Boltzmann's Constant |
| $\dot{m}$ | 125 | kg/s | mass flow rate for the rocket (fuel and oxidizer) |
| $g$ | 9.81 | m/s² | acceleration due to gravity |
| $\gamma_0$ | $\pi/2$ | rad | initial tip angle, for vertical orientation at launch |
| $M$ | 4.81E−26 | kg | mean mass of air molecule |
| $m_0$ | 12,805 | kg | initial mass of missile |
| $m_p$ | 4,444 | kg | burnout mass of missile |
| $I_{sp}$ | 239 | s | vacuum Specific Impulse of the rocket engine |
| $R$ | 8.3144621 | J/(mol·K) | universal gas constant |
| $T$ | 255 | K | mean atmospheric temperature |
| $\gamma_{BO}$ | 0.8552 | rad | target flight path angle (use 49°) |
| $R_e$ | 6,378,000 | m | Earth radius, spherical |
| $\mu$ | | m³/s² | gravitational constant |
| $\beta_m$ | | kg/m² | mass ballistic coefficient, reentry |
| $\beta_s$ | | kg/m² | scale ballistic coefficient, boost |
| $c^*$ | 1522.9 | m/s | characteristic velocity for rocket engine |
| $\rho$ | 1.752 | kg/m³ | calculated density of air (initial, sea-level) |

FIG. 2

CLOSED FORM ESTIMATOR FOR BALLISTIC MISSILE FLIGHT

CROSS REFERENCE TO RELATED APPLICATION

Pursuant to 35 U.S.C. § 119, the benefit of priority from provisional application 62/377,509, with a filing date of Aug. 19, 2016, is claimed for this non-provisional application.

STATEMENT OF GOVERNMENT INTEREST

The invention described was made in the performance of official duties by one or more employees of the Department of the Navy, and thus, the invention herein may be manufactured, used or licensed by or for the Government of the United States of America for governmental purposes without the payment of any royalties thereon or therefor.

BACKGROUND

The invention relates generally to estimate ballistic missile range and determine flight time. In particular, the invention provides a closed-form solution to improve modeling efficiency and intercept missile control through direct range calculation using real-time flight parameters.

Each phase of a ballistic missile flight has distinct characteristics, prompting a logical distinction and treatment between each. Boost phase is defined by thrust and aerodynamic interactions from launch until fuel depletion. Orbital flight consists of the nearly drag-free flight from burn-out to re-entry into the operative atmosphere. Re-entry entails the return to the atmosphere by the re-entering body until impact with the ground (or mid-air burst). These phases create conditions that, when compared, define the entire flight. Mathematically, there are an infinite number of flight paths that will reach any given impact point from any given launch point.

Conventional iterative ballistic missile range calculations yield disadvantages that are addressed by various exemplary embodiments of the present invention. These conventional techniques provide an iterative solution that requires computing time for each run and estimation factors to achieve a solution near the desired range based on flight path parameters. Such methodologies using time and parameter estimation are based on multiple iterative solutions or estimates based on parameters after boost phase has completed.

SUMMARY

Conventional iterative ballistic missile range calculation methods yield disadvantages addressed by various exemplary embodiments of the present invention. In particular, exemplary embodiments provide a closed form solution for estimating the range values. This technique enables computation of a viable solution with no iterative calculations and without iterative tables to enable in-flight correction of the flight path based on current time information.

BRIEF DESCRIPTION OF THE DRAWINGS

These and various other features and aspects of various exemplary embodiments will be readily understood with reference to the following detailed description taken in conjunction with the accompanying drawings, in which like or similar numbers are used throughout, and in which:

FIG. 1 is a graphical tabular view of transient acceleration during boost;

FIG. 2 is a tabular view of exemplary parameter values; and

DETAILED DESCRIPTION

Figure 3:
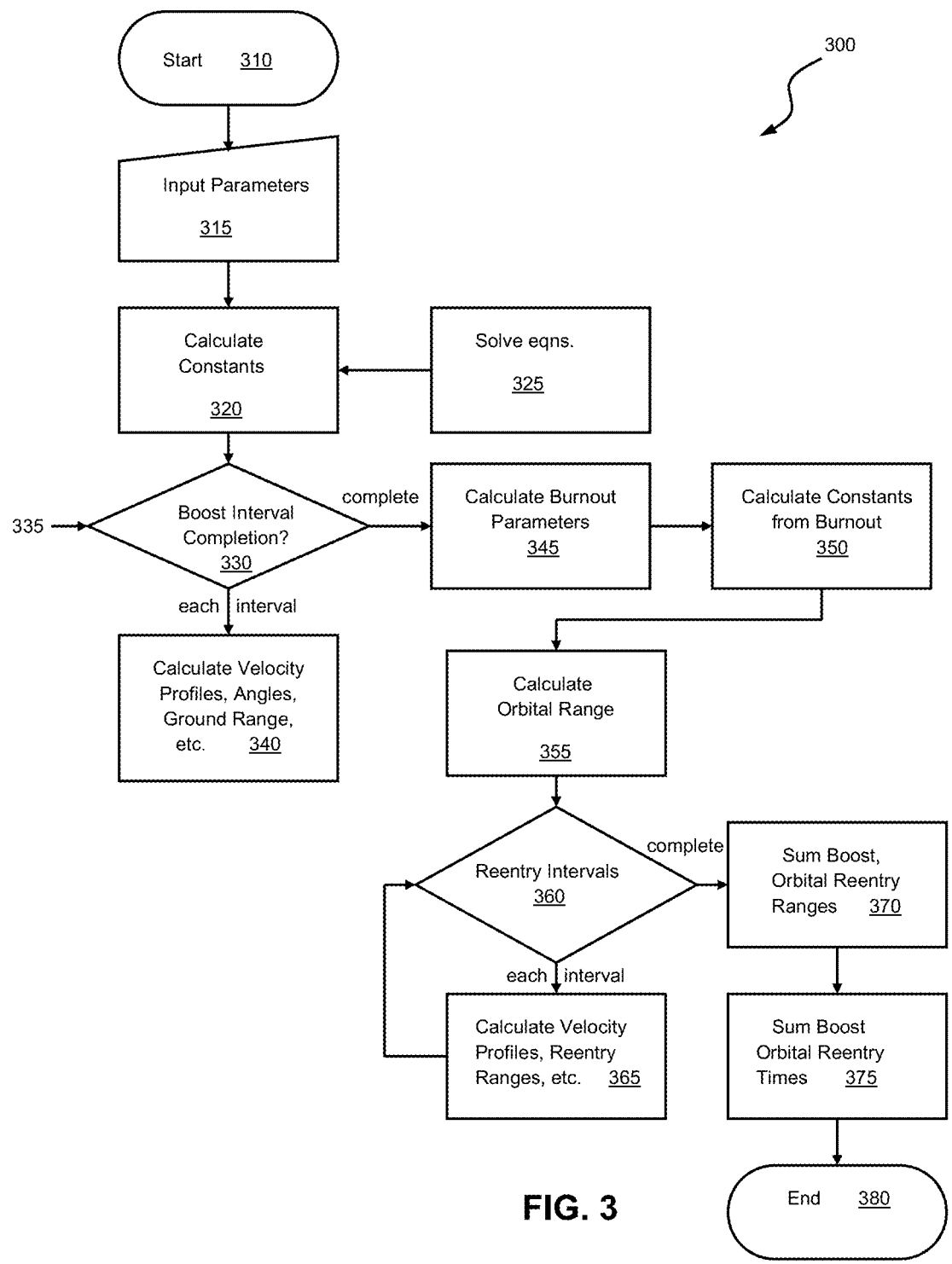
FIG. 3 is a flowchart view of software diagrams designed to utilize the closed form solution for verification.

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the present invention is defined only by the appended claims.

In accordance with a presently preferred embodiment of the present invention, the components, process steps, and/or data structures may be implemented using various types of operating systems, computing platforms, computer programs, and/or general purpose machines. In addition, those of ordinary skill in the art will readily recognize that devices of a less general purpose nature, such as hardwired devices, or the like, may also be used without departing from the scope and spirit of the inventive concepts disclosed herewith. General purpose machines include devices that execute instruction code. A hardwired device may constitute an application specific integrated circuit (ASIC), a field programmable gate array (FPGA), a digital signal processor (DSP) or other related component.

Exemplary embodiments provide ballistic missile trajectory analysis technique involving a closed form equation that estimates range and time based on the calculated burn-out state. The ballistic missile in this context refers to a rocket launched by an adversary, in which the mission objective involves determining the location of that missile's launch origin. This information can be incorporated into a fire control counterattack system.

Conventional range estimates exist for the post-boost orbital state and the re-entry state. The boosting state contains multiple non-linear behaviors that have historically been difficult to impossible to characterize. Primarily, the drag influence on the behavior of a boosting missile has been intractable. Other contributing factors to the acceleration due to thrust and gravity have known methods of estimation. This research examined the boosting profile and employed a scaling technique to generate a solution for the drag equation. This derivation has compared favorably to a traditional computational iterative solution. The mathematics for all phases of flight are sourced, where applicable, and derived to usable equations for each phase of flight. Finally, an equation is described that accounts for boost, orbital, and re-entry range contributions that consolidates the various phases. This equation is compared to iteratively modeled ballistic missiles to verify the estimate. Persons of ordinary skill in the art are assumed to possess a working knowledge of ballistic missile and rocket engine fundamentals.

Physically, the particular characteristics of each ballistic missile restrict the number of flight paths that are possible to a relative handful. In practical terms, the velocity imparted at the end of burn-out (whether complete or partial fuel use)

brings the maximum number of flight paths to two, with the special condition that those flight paths converge at the missile's maximum range (minimum energy). There are also implicit assumptions with the above restrictions, namely burn-out is near to the end of or past operative atmosphere and the orbital phase has negligible drag.

Prescribing expected the burn-out conditions with a reasonable accuracy is complicated by the drag influence during boost. During re-entry, the losses due to drag can be accounted for in a logical manner as the only other method of acceleration is gravitational. Drag losses are also somewhat easier to handle as re-entry speeds usually are well in excess of supersonic transition, thereby enabling the omission of factors that significantly raise the difficulty in estimating drag influence on a body.

Derivation of the equations has been accomplished in reverse ballistic trajectory order with the assumption that knowing where the object struck on impact would guide the investigation through the steps defining that path. Prior to this research analysis, the orbital case had been solved many decades prior. Many of the source equations for both orbital and re-entry flight are from F. J. Regan and S. M. Anadrakrishnan: *Dynamics of Atmospheric Re-entry* (1993) as similar units and mathematical treatment were used to derive equations for both phases of flight. Likewise, similar units and techniques were used to derive the boost phase of flight for a single stage system and then extended to a multistage missile. The equations for boosting, orbital and re-entry flight were combined into a singular equation.

Re-Entry Derivation—calculations for re-entry generally begin with the effective atmosphere, generally around 100 kilometers (km) altitude. This research uses 120 km altitude as the re-entry height. This enables the equations to "feather in" atmospheric drag from essentially none at 120 km (very nearly zero) to fairly significant at low elevations. Assumptions are required to account for the mathematical complications caused by the nearly-exponential increase of atmospheric density, the non-linear slowdown of the re-entry body, and the slow change of gravitational force as a function of altitude and the small but measurable effect of mass loss due to re-entry. Careful consideration of the problem and mathematical arguments within Regan et al. led to the following assumptions and equations being used to describe the re-entry of the body.

Utilization of a "linear approximation" of the re-entry enables a series solution to the re-entry problem. The remaining concern revolved around which parameters to linearize. Taking the perspective of a re-entering body, the atmospheric density has phases that are pseudo-linear in continuous shortening intervals of heights above ground as the vehicle descends through the atmosphere. The result is a logarithmic emulation of altitude segments, providing the pseudo-linear behavior of density, in the form of layers of known height. Additional simplification is required as the atmosphere is a near-exponential with known variation. Direct calculation requires a mathematical equation for density, which is supplied by the exponential density equation, also used during the boosting phase of flight, as an appropriate and reasonable estimate.

The density equation employed is obtained from Regan et al. equation 2.32 on page 38:

$$\rho = \rho_0 e^{\frac{-h_j}{H}}, \tag{1}$$

where: H=6700 meters (m) is scale height,
$\rho_0$=1.752 kilograms-per-cubic-meter (kg/m³) is initial density value,
$h_j$ altitude variable, meters (m).

The primary focus centers on a body for non-lifting re-entry being the least complicated and nominal case for a missile. Regan et al. provide multiple reentry scenarios, including lifting forces and various pitch behaviors.

The closest case scenario is a non-lifting non-vertical steep reentry, which is Case 4 in Chapter 7 of Regan et al. While the premise assumes a steep re-entry, the equations should be applicable to a re-entry with no lift and a relatively steep descent. This is a reasonable estimate as the primary acceleration is related to axial drag. Normal drag and gravitational forces, while non-zero, provide a minor effect being much smaller than the axial drag acceleration. One assumption is a constant flight path angle for the re-entry. This is a slightly more consequential limitation, as a near vertical descent has a constant flight path angle 7 with an increased tendency to deviate from that condition as a body moves further from vertical. The consequences of this assumption can be assumed to be relatively minor, with resultant normal acceleration error on the order of the already ignored normal forces or less.

The following derivations utilize linear approximation to render the problem tractable. First, the time $t_n$ to travel through an atmospheric layer $h_n$ is:

$$t_n = \frac{h_{n-1} - h_n}{V_{n-1}\sin\gamma_n}, \tag{2}$$

where subscripts n and n−1 respectively represent current and subsequent atmospheric layers, and $V_{n-1}$ is incoming velocity. While an average velocity is possible to calculate and might create a more accurate estimate, the use of the initial speed reduces the interval period spent in the layer, and acts as a conservative estimate for the range. As mentioned above, constant flight path angle $\gamma_n$ corresponds to the initial re-entry value $\gamma_E$.

The total time to re-enter $t_{RE}$ is the summation of eqn. (2):

$$t_{RE} = \sum_{i=1}^{n} \frac{h_{i-1} - h_n}{V_{i-1}\sin\gamma_E}, \tag{3}$$

where the altitudes $h_i$ are known and the incoming velocity needs to be calculated. Equation 7.39a from Regan et al. calculates this velocity as a function of a constant variable and an exponential that includes normalized height as a ratio with a scale height. This relation assumes a constant flight path angle and neglects the gravitational component. Equation 7.39a is derived from equation 7.38 (including missing negative sign for the second exponential term that this disclosure corrects):

$$V = V_{RE}\exp\left[\frac{\rho_0 H e^{-h_E/H}}{2\beta_m \sin\gamma_E}\right]\exp\left[-\frac{\rho_0 H e^{-h_i/H}}{2\beta_m \sin\gamma_E}\right], \tag{4}$$

where $V_{RE}$ is the re-entry velocity, $h_E$ is the equivalent spherical radius of the earth (approximately 6378 km) and $\beta_m$ is the ballistic coefficient:

$$\beta_m = \frac{w}{C_{D_0} S g}, \tag{5}$$

where w denotes weight of the re-entering object, $C_{D_0}$ is drag coefficient at zero lift, g is gravitational acceleration and S is reference area. These are known quantities of the body shape. The values for ballistic coefficient $\beta_m$ can be readily established for an existing system.

For velocity in eqn. (4), the first exponential term is nearly unity for typical values. This simplifies eqn. (4) to:

$$V = V_{RE} \exp[-\alpha_e e^{-h_i/H}], \tag{6}$$

where velocity decay coefficient $\alpha_e$ is:

$$a_e = \frac{\rho_0 H}{2\beta_m \sin\gamma_E}. \tag{7}$$

Now velocity, altitudes, and time are known or calculable. Starting with linear, constant acceleration to describe the range R:

$$R = R_0 + V_0 t + \frac{1}{2} a t^2, \tag{8}$$

where $R_0$ is the initial range and acceleration $\alpha$ is the change in velocity V over time t for change in increment i:

$$a = \frac{V_{i+1} - V_i}{t_{i+1} - t_i}. \tag{9}$$

The velocity terms for range, in the case for a two-dimensional vector, are multiplied by the cosine of the flight path angle. In the case of eqn. (8), the time variable t is equivalent to difference $(t_{i+1} - t_i)$. Substituting eqn. (9) into eqn. (8) and setting initial range $R_0 = 0$ for the initial condition at that specific level for incremental range $R_1$ yields:

$$R_i = V_0 \cos\gamma_0 t + \frac{1}{2}\left[\frac{V_i \cos\gamma_0 - V_0 \cos\gamma_0}{t}\right] t^2, \tag{10}$$

where the naught subscript notation indicates the initial condition of the atmospheric layer (i.e., range $R_0$ and flight path angle $\gamma_0$), and the $i^{th}$ notation indicates the exit condition of the layer. This simplifies to:

$$R_i = \frac{1}{2} V_0 \cos\gamma_0 t + \frac{1}{2} V_i \cos\gamma_0 t. \tag{11}$$

To define a specific layer in terms of the above, eqn. (2) is substituted into eqn. (11), which results in the range equation for a particular layer as:

$$R_i = \frac{\cos\gamma_0}{2}(V_0 + V_i)\left[\frac{h_0 - h_i}{V_0 \sin\gamma_0}\right], \tag{12}$$

such that eqn. (12) is one part of a summation of all of the layers between reentry and ground level. The notation becomes traditional, where the initial conditions of each layer are indexed by layer. The naught condition exists as the initial re-entry condition at 120 km altitude, and any $i^{th}$ value represents the condition at the respective atmospheric level for the bottom of the "layer" in the atmosphere.

Simplification and consolidation of terms results in the following range equation for a re-entering object:

$$R_{RE} = \left(\frac{\cos\gamma_0}{2\sin\gamma_0}\right) \cdot \left[(h_0 - h_1)\{1 + \exp[-a_e e^{-h_1/H}]\} + \sum_{i=2}^{n}(h_{i-1} - h_i)\{1 + \exp[a_e e^{-h_{i-1}/H} - a_e e^{-h_i/H}]\}\right]. \tag{13}$$

Both range and time estimations are available through eqns. (13) and (3), respectively.

Orbital Derivation—orbital conditions persist from the time of booster burn-out/engine cutoff through re-entry in a relatively drag-free environment due to an extremely rarefied atmosphere. The relevant assumptions explicitly state a drag-free solution. The starting point for this derivation originates from Regan et al. Chapter 6, primarily Sections 1-3. The determining factors for orbital range are velocity at burn-out $V_{BO}$ and flight path angle at burn-out $\gamma_{BO}$. Orbital range also depends on the burn-out height $Z_{BO}$, although this is much smaller than the contribution of the earth's radius and thus influences range to a lesser extent. The subtended angle $\theta_k$ (arc range) calculated for orbital range is relative to the burn-out height $Z_{BO}$. This difference affects estimated range when the burn-out height $Z_{BO}$ is dissimilar to an assumed re-entry height $Z_{RE}$, causing over- or under-estimation.

The maximum range, minimum energy ballistic flight has a single flight path angle solution denoted as $\gamma_{BO}^*$, which is helpful to note for a closed form solution. This equation is found in Regan et al. as equation 6.36, rewritten for reference in eqn. (14).

$$\tan(2\gamma_{BO}^*) = \frac{\sin\theta_k}{\left[1 + \frac{Z_{BO}}{R_e}\right] - \cos\theta_k}, \tag{14}$$

where $\theta_k$ is the arc range of the orbital portion of the ballistic flight, in radians. An estimate of the flight path angle at maximum range $\gamma_{BO}^*$ is easier to obtain for burn-out altitude $Z_{BO}$ being negligible in relation to the radius of the earth $R_e$. This condition is generally applicable, copied from Regan's equation 6.37:

$$\gamma_{BO}^* = \frac{\pi}{4} - \frac{\theta_k}{4}. \tag{15}$$

The originating relation for the orbital range is Regan et al. equation 6.36, solved for the velocity required at burn-out for a given range. This relation is re-worked below to provide the range utilizing known velocity and values for burn-out flight path angle $\gamma_{BO}$. Some derivations from orbital dynamics leading to equation 6.34 are not replicated here. The equation for the initial orbital velocity (the burn-out velocity) can be written as:

$$V_0 = \left\{ \frac{\mu}{r_0} \left[ \frac{1-\cos\theta_k}{(r_0/R_e)\cos^2\gamma_{BO} - \cos(\theta_k + \gamma_0)\cos\gamma_{BO}} \right] \right\}^{\frac{1}{2}}, \quad (16)$$

where initial altitude is:

$$r_0 = R_e + Z_{BO}, \quad (17)$$

and gravitational parameter is:

$$\mu = g\, R_e^2. \quad (18)$$

One can use $R_e$ as the circular earth's radius, although a local ellipsoid radius would also suffice if chosen properly. Solving for arc range $\theta_k$ requires extensive mathematical manipulation. The multiple sub-steps are provided to facilitate understanding of the process. Squaring both sides and consolidating the terms on the right-hand-side (RHS) outside of the brackets leads to:

$$\frac{V_0^2 r_0}{\mu} = \frac{1-\cos\theta_k}{\left(\frac{r_0}{R_e}\right)\cos^2\gamma_{BO} - \cos(\theta_k + \gamma_{BO})\cos\gamma_{BO}}. \quad (19)$$

Using angle sum formula, simplifying and consolidating terms:

$$\frac{V_0^2 r_0}{\mu}\cos^2(\gamma_{BO}) \cdot \frac{r_0}{r_e} = \qquad\qquad (20)$$
$$1 - \cos\theta_k + \frac{V_0^2 r_0}{\mu}\cos^2\gamma_{BO}\cos\theta_k - \frac{V_0^2 r_0}{\mu}\cos^2\gamma_{BO}\sin\theta_k\tan\gamma_{BO}.$$

The last two terms on the RHS have a sine or cosine of arc range $\theta_k$ in common. Using the linear combination for sine and cosine:

$$a\sin x + b\cos x = c\sin(x+\varphi), \quad (21)$$

where the combination is:

$$c = \sqrt{(a^2 + b^2)}, \quad (22)$$

and angle:

$$\varphi = a\tan2(b, a) = \arctan\left(\frac{b}{a}\right), \quad (23)$$

simplifies eqn. (20) to:

$$\frac{V_0^2 r_0}{\mu}\cos^2(\gamma_{BO}) \cdot \frac{r_0}{r_e} = 1 - \cos\theta_k + \qquad (24)$$
$$\left[\left(-\frac{V_0^2 r_0}{\mu}\sin(2\gamma_{BO})\right)^2 + \left(\frac{V_0^2 r_0}{\mu}\cos^2\gamma_{BO}\right)^2\right]^{\frac{1}{2}} \sin\left(\theta_k + \frac{\pi}{2} + \gamma_{BO}\right).$$

Using the following relations for combined angle:

$$\vartheta = \theta_k + \gamma_{BO}, \quad (25)$$

$$\sin\left(\frac{\pi}{2} + \vartheta\right) = \cos\vartheta = \cos\theta_k\cos\gamma_{BO} - \sin\theta_k\sin\gamma_{BO}, \quad (26)$$

and substituting the following for variable $\aleph$ as:

$$\aleph = \left[-\frac{V_0^2 r_0}{\mu}\sin(2\gamma_{BO})\right]^2 + \left[\frac{V_0^2 r_0}{\mu}\cos^2\gamma_{BO}\right]^2, \quad (27)$$

enables simplification and consolidation of terms, leading to:

$$\frac{\aleph^{-\frac{1}{2}}}{\sin\gamma_{BO}}\left[\frac{V_0^2 r_0}{\mu}\cos^2\gamma_{BO}\frac{r_0}{r_e} - 1\right] = \cos\theta_k\left[\frac{\cos\gamma_{BO}}{\sin\gamma_{BO}} - \frac{1}{\aleph^{1/2}\sin\gamma_{BO}}\right] - \sin\theta_k. \quad (28)$$

Applying eqn. (21) to the RHS, with term consolidation:

$$\frac{\frac{V_0^2 r_0}{\mu}\cos^2(\gamma_{BO}) \cdot \frac{r_0}{r_e} - 1}{\left[1 + \left(\cot\gamma_{BO} - \frac{1}{\aleph^{1/2}\sin\gamma_{BO}}\right)^2\right]^{1/2} \aleph^{1/2}\sin\gamma_0} = \qquad (29)$$
$$\sin\left[\theta_k + \arctan\left(-\cot\gamma_{BO} + \frac{1}{\aleph^{1/2}\sin\gamma_{BO}}\right)\right].$$

Final algebra and consolidation results in arc range of:

$$\theta_k = \arcsin\left[\frac{\frac{V_0^2 r_0}{\mu}\cos^2(\gamma_{BO}) \cdot \frac{r_0}{r_e} - 1}{\left[1 + \left(\cot\gamma_{BO} - \frac{1}{\aleph^{1/2}\sin\gamma_{BO}}\right)^2\right]^{1/2} \aleph^{1/2}\sin\gamma_{BO}}\right] - \qquad (30)$$
$$\arctan\left[-\cot\gamma_{BO} + \frac{1}{\aleph^{1/2}\sin\gamma_{BO}}\right].$$

This provides arc range $\theta_k$ in terms of burn-out parameters and constant values.

A similar approach to determine the time to travel for arc range $\theta_k$ based on the initial parameters was calculated in Regan et al. in equation 6.41a, which is copied in eqn. (31) as range time:

$$t_k = \qquad (31)$$
$$\frac{r_0}{V_0\cos\gamma_{BO}}\left[\frac{\tan\gamma_{BO}(1-\cos\theta_k) + (1-\lambda)\sin\theta_k}{(2-\lambda)\left\{\frac{1-\cos\theta_k}{\lambda\cos^2\gamma_{BO}} + \frac{\cos(\theta_k+\gamma_{BO})}{\cos\gamma_{BO}}\right\}}\right] + \left[\frac{2r_0}{V_0\lambda\left(\frac{2}{\lambda}-1\right)^{3/2}}\right.$$
$$\left.\tan^{-1}\left(\frac{\left(\frac{2}{\lambda}-1\right)^{1/2}}{\cos\gamma_{BO}\cot\left(\frac{\theta_k}{2}\right) - \sin\gamma_{BO}}\right)\right],$$

where inertial parameter:

$$\lambda = \frac{V_0^2}{\mu/r_0}, \quad (32)$$

is a function of burn-out velocity $V_0$, initial altitude $r_0$ and gravitational parameter $\mu$ from eqn. (18). At this stage, eqn. (31) need not be derived further due to range time c being a component of the total flight time $t_f$. The burn-out conditions bound the range time $t_k$, which remains unknown until those conditions are determined, and eqn. (30) provides the range portion of the orbital flight.

Boosting Derivation—the boost portion of flight is dependent on non-linear interactions of the missile with its environment. The most difficult factors are contributions due to atmospheric interactions. Traditional ballistic boost profile minimizes drag forces and does not utilize a lifting body. This analysis explicitly assumes a non-lifting boost profile. Atmospheric density is also an exponential atmosphere for this portion of flight. The boost profile also assumes linearization for segments of the boost profile. Modeling has shown this to be an acceptable approach, remaining within ~10% of traditional iterative modeled acceleration.

The modeling quality can be illustrated graphically by the transient nature of acceleration. FIG. 1 shows a plot view 100 of acceleration as a function of time comparing iterative and closed-form solutions. Time (s) represents the abscissa 110 and acceleration (m/s$^2$) represents the ordinate 120. A legend 130 identifies the predictive responses, with a first line 140 representing the exemplary closed form solution and a second line denoting the iterative process. The plot view 100 shows reasonably close tracking, with the closed-form being much more expedient to calculate than the iterative form.

Gravitational acceleration exponentially decreases with altitude. However, most missiles do not experience an appreciable reduction in gravitational acceleration. The analysis here makes the simplifying assumption that gravity is constant. This assumption introduces a minimal error, which is acceptable as long as the burn-out of the missile is within 500 km altitude. This derivation is for a single-stage, non-separating system. The boosting solution is extensible to multi-stage systems for the payload, taking into account the burn times for each stage, mass and velocity changes, and any non-boosting segments of significant duration. These considerations are included as segments of the profile with the final burn-out as the desired parameter. For the purposes of this explanation, a single-stage system is sufficient to present the mathematics.

Accelerations that contribute to the kinetic energy of a ballistic missile are conceptually straight forward. Thrust of the rocket imparts an acceleration that exponentially increases as fuel is expended and atmospheric conditions approach the design conditions of the nozzle. Gravitational acceleration acts as a loss on the thrust, reducing the imparted acceleration dependent on the orientation of the body. Drag and lifting forces are due to atmospheric interactions. Lifting forces have been excluded from consideration. Drag forces are dependent on the missile shape, angle of attack, atmospheric density, and velocity.

Angle of attack can be assumed to be negligible as boost profiles try to minimize the drag and side loads on a boosting rocket. If the missile's angle of attack exceeds this condition, the missile can exceed physical limits on side forces, resulting in its disintegration. This enables the exemplary process to only consider the zero lift drag coefficient $C_{D_0}$. The atmospheric density $\rho$ is determined through a height calculation based on a vertical flight profile derived from a sounding rocket without drag. While inaccurate, maintaining drag within this portion of the solution requires the height to include a drag value based on the height being calculated, rendering this approach intractable.

Each of these acceleration contributions will be introduced separately as they relate to a boosting rocket. The equations are then combined to determine burn-out velocity and ground range from the launch point. Rocket engine thrust depends on the design conditions and its atmospheric conditions. Thrust for off-nominal conditions causes a reduction, which can be viewed as a loss that depends on altitude. That loss is within the acceleration equation portion related to thrust. To start, some term definitions are required for mass ratio of usable propellant, mass ratio of structure and payload, and burnout time:

$$\Re = \frac{m_p}{m_0}, \tag{33}$$

$$\xi = 1 - \Re, \tag{34}$$

$$t_{BO} = \frac{m_0 - m_p}{\dot{m}}. \tag{35}$$

The eqns. (33), (34) and (35) are standard rocket ratios and equations. The term $\Re$ in eqn. (33) is the mass ratio of useable propellant mass $m_p$ to initial mass $m_0$ and $\xi$ is the non-propellant mass ratio, and eqn. (35) provides the total burn time $t_{BO}$ using a constant mass utilization rate $\dot{m}$. While a constant mass flowrate $\dot{m}$ lacks inherent validity for most solid rocket engines, the purpose of eqn. (35) is to calculate the total time the engine is thrusting. Thus an average mass flowrate $\dot{m}$ can suffice. Utilizing a burnout time $t_{BO}$ calculated for the end of a burn for a liquid system, rather than determined by fuel extinction, does not negate the remainder of this section, assuming proper accountability for remaining fuel (i.e., not expended in mass ratio $\Re$). Using a common acceleration estimation for re-entry accounts for thrust alone, disregarding other effects:

$$a_{RE_i} = \frac{c^* \xi / t_{BO}}{1 - \xi\left(\frac{t_i}{t_{BO}}\right)}, \tag{36}$$

where $c^*$ is the characteristic velocity of the rocket engine. The loss due to atmospheric pressure can be non-trivial, but does not constitute a majority of the acceleration reduction. Calculating the loss is complicated by the need for height information and design altitude. The loss of thrust was characterized as a percentage of the maximum thrust, moderated by the exponential atmosphere.

Other methods for calculating this loss are possible; especially procedures based on the exponentials scaled to the design parameters. The following derivation of the loss assumes a vacuum characteristic velocity for the rocket engine. Modeling this condition set the thrust loss at launch to 10% of the design thrust, which matches the calculated losses. This percentage is based on estimated losses for rocket engines in general with this design consideration. This loss fraction using the loss variable $l_R$:

$$a_{RL_i} = l_R a_{RE_i} e^{-h_i/H}. \tag{37}$$

To this effect, eqns. (36) and (37) can be combined to provide the total acceleration due to thrust as:

$$a_{R_i} = a_{RE_i} - a_{RL_i}, \tag{38}$$

which becomes:

$$a_{R_i} = \frac{\left(\frac{c^* \xi}{t_{BO}}\right)}{1 - \xi\left(\frac{t_i}{t_{BO}}\right)} \{1 - l_R e^{-h_i/H}\}, \tag{39}$$

in which eqn. (39) defines the estimated thrust for a rocket with atmospheric losses based on altitude $h_i$. This is problematic when using eqn. (39) to determine accelerations. A technique is needed to estimate the altitude, derived based on the equations for a drag-free, vertically launched sounding rocket. The starting assumptions are no velocity or height. Starting with altitude change rate:

$$\frac{dh}{dt} \equiv \dot{h} = V_0 - gt + c^* \ln \frac{m_0}{m_i}, \quad (40)$$

where $m_i$ is mass at time interval i that corresponds to the altitude $h_i$.

After integration, the height h at time t is:

$$h_i = V_0 t - \frac{1}{2} g t^2 + c^* \left[ -\frac{m_0 - \dot{m}t}{\dot{m}} \left( \ln \frac{m_0}{m_0 - \dot{m}t} + 1 \right) + C \right], \quad (41)$$

where C is the constant of integration, which can be system specific. This constant is not trivial, as modeling demonstrated its necessity for calculating an approximate height. The approximation was highly sensitive to the value of integration constant C. Modeling with the Second World War German guided ballistic missile Aggregat-4 (subsequently designated Vergeltungswaffe-2 or V-2) resulted in a constant of 102.375. This approximation can be incorporated at each time-based step independently based on starting conditions with average mass flow and time.

Linearization enables using the common gravitational term for the boost phase:

$$a_{g_i} = -\frac{1}{2} g t^2. \quad (42)$$

As previously stated, gravity g is considered constant for the boost phase. The remaining acceleration term is the drag term. Derivation of a useful acceleration reduction due to drag was not immediately apparent. Drag estimation started along the normal lines considering drag coefficient $C_D$, supersonic influences and density variations.

While traditional, these considerations added uncertainty and mathematical complications. Research into drag calculations led to discovery of the AIAA paper "Aerodynamics of Trans-Atmospheric Vehicles: A NonDimensional Approach" by E. A. Ustinov (2006). Developments within that document discuss a non-dimensional drag equation in equation IV.6 and exponential atmosphere. These developments led to the inception of a "scale drag" function to approximate drag during boost.

$$D = C_D \frac{1}{2} \rho V^2 S, \quad (43)$$

such that eqn. (43) provides the common simplified drag force equation, where S denotes the reference area. The drag coefficient $C_D$ changes due to shocks and various aerodynamic consequences, which alters the calculated drag, with values ranging from near zero to around five. As a result, drag on an airframe is relatively low at low altitudes due to slow velocity. Drag forces peak at some intermediate altitude with dynamic pressure and diminish again due to atmospheric density decreasing with altitude.

Ultimately, the altitude and velocity are the primary determinants of the drag forces and coefficient $C_D$ is a modifier of the dynamic pressure, referred to as q. This logically leads to a ballistic coefficient type result, with an important caveat. Ballistic coefficients are dependent on a constant mass, which is not available during boost. For reference, the ballistic coefficient is calculated as:

$$\beta = \frac{m}{C_{D_0} S}. \quad (44)$$

Preferably, one would capture a β-like constant to simplify the acceleration due to drag to a constant and exponentials.

Research into various missiles showed the maximum dynamic pressure max Q to be in the rough vicinity of the scale height used for the exponential atmosphere. A related term to scale height is the scale velocity $V_H$. This is the velocity if the object were dropped from the scale height without drag. Ustinov lists this in equations III.3a and III.3b (respectively):

$$V_H = \sqrt{2gH} = \sqrt{2RT}, \quad (45)$$

where R is the universal gas constant (8.3145 J/(mol·K)) and T is the mean atmospheric temperature (T=250 K). Setting scale velocity $V_H$ equal to the vertical equation for velocity of a rocket without drag:

$$V_H = c^* \ln\left(\frac{m_0}{m_s}\right) - gt. \quad (46)$$

Solving for the scale mass $m_s$ obtains:

$$m_s = m_0 e^{-\frac{V_H + gt}{c^*}} = m_0 \exp\left[-\frac{V_H + gt}{c^*}\right]. \quad (47)$$

However, the time t remains unknown.

Using scale time $t_H$ from Ustinov, equation 111.10 to bound the problem to the time to fall from the scale height:

$$t_H = \frac{2H}{V_H}. \quad (48)$$

Inserting eqn. (48) into eqn. (47) gives the scale mass as:

$$m_s = m_0 \exp\left[-\frac{V_H + g(2H/V_H)}{c^*}\right], \quad (49)$$

where scale mass $m_s$ is a constant value, providing the backdrop for the scale ballistic coefficient at boost $\beta_s$. Inserting eqn. (49) into eqn. (44) gives:

$$\beta_s = \frac{m_0 e^{-\frac{V_H + g \frac{2H}{V_H}}{c^*}}}{C_D S}. \quad (50)$$

Dividing eqn. (43) by mass yields a drag acceleration:

$$a_D = \frac{1}{m} C_D \frac{1}{2} \rho V^2 S. \quad (51)$$

Inserting eqn. (1), eqns. (49) and (50) into eqn. (51) produces:

$$a_{D_i} = \frac{\rho_0}{2\beta_s} e^{-h_i/H} V_i^2, \quad (52)$$

such that eqns. (40) and (41) provide estimates for the velocity and height, respectively. The linearized acceleration for a boosting missile, in conjunction with eqn. (38), is:

$$\alpha_i = \alpha_{RE_i} - \alpha_{RL_i} + \alpha_{g_i} \sin\gamma_i - \alpha_{D_i} = \alpha_{R_i} + \alpha_{g_i} \sin\gamma_i - \alpha_{D_i}. \quad (53)$$

The gravitational influence changes as the missile begins to tip over. Setting flight path angle $\gamma_i$ equal to the following:

$$\gamma_i = \gamma_0 - \gamma_R \cdot \left(\frac{t_i + t_{i-1}}{2t_{bo}}\right), \quad (54)$$

where $\gamma_R$ is the angular target value from vertical for the end of boosting stage flight path angle $\gamma_0$. The multiplier is the middle of the time step divided by the total stage burn time.

This approximates the effect of the missile tipping over at a given rate, based on the burn rate of the rocket. Also, eqn. (54) is useful also within the linearized range equation, for any interval i:

$$R_i = R_{i-1} + V_i t_i + \frac{1}{2} a_i t_i^2, \quad (55)$$

where $t_i$ is the time interval selected for boost, and can be any variation. However, a constant value based on a number of partitions of the total burn time seems to be the most appropriate. The horizontal range increment is thus:

$$R_{iH} = R_{i-1(H)} + V_i \cos\gamma_i t_i + \frac{1}{2} a_i \cos\gamma_i t_i^2, \quad (56)$$

and the vertical range is:

$$R_{iV} = R_{i-1(V)} + V_i \sin\gamma_i t_i + \frac{1}{2} a_i \sin\gamma_i t_i^2. \quad (57)$$

To calculate the height at burn-out $Z_{BO}$ a summation of eqn. (57) is required. Given the relatively small value of burn-out height $Z_{BO}$, this was assumed negligible in the orbital portion and so is not explicit here. The necessary portion to complete the range calculation is the horizontal range, and the summation for this is:

$$R_{BH} = \sum_{i=1}^{n} \left[ R_{i-1(H)} + V_i \cos\gamma_i t_i + \frac{1}{2} a_i \cos\gamma_i t_i^2 \right], \quad (58)$$

where n is the number of intervals selected, and the times are determined based on the $i^{th}$ time interval. Time is already established as the rocket burn time. Multi-stage systems can take advantage of the interval system, as long as the appropriate values are assigned for the correct interval. Liquid systems can be shut off prior to expending its fuel load, adding an additional dimension to the analysis.

Combined Equation: Combining eqns. (13), (30) and (58), the resulting arc range formula for the flight is:

(59)

$$\theta_{LI} = \frac{1}{R_e}\left[\sum_{i=1}^{n}\left(R_{i-1(H)} + V_i\cos\gamma_i t_i + \frac{1}{2}a_i\cos\gamma_i t_i^2\right)\right] +$$

$$\arcsin\left[\frac{\frac{V_0^2 r_0}{\mu}\cos^2(\gamma_{BO}) \cdot \frac{r_0}{r_e} - 1}{\left[1 + \left(\cot\gamma_{BO} - \frac{1}{\aleph^{1/2}\sin\gamma_{BO}}\right)^2\right]^{1/2}\frac{1}{\aleph^{1/2}\sin\gamma_{BO}}}\right] -$$

$$\arctan\left(-\cot\gamma_{BO} + \frac{1}{\aleph^{1/2}\sin\gamma_{BO}}\right) +$$

$$\frac{1}{R_e}\left[\frac{\cos\gamma_E}{2\sin\gamma_E}\left\{(h_0 - h_1)(1 + \exp[-a_e e^{-h_1/H}]) + \sum_{i=2}^{n}(h_{i-1} - h_i)[1 + \exp(a_e e^{-h_{i-1}/H} - a_e e^{-h_i/H})]\right\}\right],$$

so that eqn. (59) is a complicated equation with multiple summations. Each mode of flight was left mathematically intact to ensure clarity with the equations used. Thus eqn. (59) produces an estimated range in radians for known input variables. Although the range in ballistic missiles can be quantified by physical distances, measured in kilometers (km), the flight path is kinematically easier to comprehend when calculated in angles. This requires "straight line approximate" answers for boost and re-entry be divided by the radius of the earth $R_e$ using the correct units of radians.

Calculating the time of flight using eqns. (3), (31) and (35) in conjunction with the same combinational approach yields ballistic flight time as:

$$t_{LI} = t_{BO} + \frac{r_0}{V_0\cos\gamma_{BO}}\left\{\frac{\tan\gamma_{BO}(1-\cos\theta_k) + (1-\lambda)\sin\theta_k}{(2-\lambda)\left[\frac{1-\cos\theta_k}{\lambda\cos^2\gamma_{BO}} + \frac{\cos(\theta_k + \gamma_{BO})}{\cos\gamma_{BO}}\right]}\right\} + \quad (60)$$

$$\left\{\frac{2r_{BO}}{V_0\lambda\left(\frac{2}{\lambda} - 1\right)^{\frac{3}{2}}}\tan^{-1}\left[\frac{\left(\frac{2}{\lambda} - 1\right)^{\frac{1}{2}}}{\cos\gamma_{BO}\cot\left(\frac{\theta_k}{2}\right) - \sin\gamma_{BO}}\right]\right\} +$$

$$\sum_{i=1}^{n}\frac{h_{i-1} - h_i}{V_{i-1} + \sin\gamma_E}.$$

Each mode of ballistic flight is likewise preserved with eqn. (60). Between eqns. (59) and (60), the estimated range and time of flight of the ballistic missile can be determined. Burnout time $t_{BO}$ might be a summation for multiple stages and might also include thrust-free (no acceleration $\alpha_{R_i}$ term) coasting zones.

Closed Form Solution Comparison to Iterative Model of Actual Single Stage Rocket—the closed form solution requires validation of the results. The equation was compared to an iterative 3+2 model to act as a sanity check on the boost phase and overall equations. Verification involved the first ballistic missile to be used in combat, the German V-2. This provided unexpected difficulty in determining missile parameters and also challenged the closed form solution, because that missile never reaches the currently accepted definition of "exo-atmospheric", in contrast to modern long range missiles. The first challenge was solved through comparing multiple historically centered websites on the V-2 missile as well as a similar model. The inputs were cross checked and executed within the iterative model to verify the results matched stated maximum range of the V-2.

FIG. 2 shows a tabular listing view 200 of the component parameters involved in the exemplary trajectory calculation technique. The view 200 includes parameters input into the closed form solution, listed by component symbol 210, corresponding values 220 for the V-2, units 230 and physical description 240. The view 200 divides the components into a first grouping 250 for input components, and a second grouping 260 for calculated components.

The iterative model includes atmospheric effects on thrust, gravitational variation, and dynamically estimates the drag. This exemplary model uses a constant gravity turn model for tip over, which results in a profile very similar to the single-stage V-2. The challenges of the non-linear effects were expected to show areas of significant disagreement with the boost phase equations. However, the boosting phase equation compared favorably with strong agreement. View 100 displays the accelerations between the two methods. The iterative model drops off at the last moment as that value included in the chart was near zero.

The closed form solution approximates over large steps while the iterative solution has a much finer scale, producing some disparity. As atmospheric effects diminish, the closed form solution agrees very well with the iterative solution. The closed form solution provides these results far more quickly. A comparison of the full solution was pursued, starting with the preexisting code for comparing the boost accelerations.

The historical apogee for a maximum range launch for the V-2 is around 90 km altitude, which makes the re-entry assumption previously of 120 km inappropriate. For code being operated with the initial re-entry assumption, the expected results include much longer ranges than possible with the V-2, including a massive altitude disconnect. Several approaches were tried including starting at the altitude where the V-2 recovers its burn-out velocity and the boost profile's burn-out height.

Re-evaluation of the original purpose of 120 km altitude results in 50 km altitude as the re-entry height for the V-2. This is due to the height constituting the atmospheric location where density increases to over 10% of its sea level value. This represents an increasing drag altitude where the drag value is quickly becoming significant. Changing the altitude results in reasonable estimates even though the closed form solution was not intended to model nonexoatmospheric ballistic missiles. Using a modified altitude for re-entry might be sufficient to provide valid estimates for short range ballistic missiles despite not being considered at the onset of the derivation.

Mathematical issues also emerged when the algorithms were encoded. The orbital range calculation came out negative with imaginary numbers and the re-entry range calculation was negative. These issues required evaluation to ensure the mathematical derivation was correct. The re-entry calculation produced negative results, which reduced the calculated range. Inspection of the mathematics showed that the re-entry range sign was being set by the first term seen in eqn. (13) by the sine function in the denominator.

The re-entry angle $\gamma_E$ is negative by convention, being below the local horizontal. The cosine in the numerator is always positive, and the ratio provides identical numbers, except for the sign, for practical re-entry values from 1° to 90°. In addition, range in a negative sense assumes a known direction in the case of a globe or an ellipsoid. This first term was taken as the magnitude as a sign doesn't make sense in calculating range, and the value is identical. This changes eqn. (13) to the following for re-entry range:

$$R_{RE} = \left|\frac{\cos\gamma_E}{2\sin\gamma_E}\right| \cdot \left[(h_0 - h_1)\{1 + \exp[-a_e e^{-h_1/H}]\} + \sum_{i=2}^{n}(h_{i-1} - h_i)\{1 + \exp[a_e e^{-h_{i-1}/H} - a_e e^{-h_i/H}]\}\right]. \quad (61)$$

The orbital range relation eqn. (30) was more problematic. The negative irrational number for likely re-entry values pointed to potential derivation issues. The problem was isolated to the orbital term. The ratio within the term results in values below negative unity. The mathematical result is the arcsine term then equals "$-\pi/2$" plus an imaginary term. The real value for the arcsine term remains constant and represents an actual physically meaningful term. The imaginary part did not make physical sense, which drove the decision to retain the real portion and set the arcsine portion of the equation to "$-\pi/2$" instead. This solution, however, only solved the imaginary part. The negative value was not offset and compounded with the arctangent in an adverse manner. The resulting quantities for the short-range V-2 were thirty times their proper value.

Review of the derivation shows the accurate method for the linear phase combinations is the function "a tan 2", which preserves the correct sign for the a tan term. In the case of this derivation, the y-term, which is the b term in the linear phase combination function, in a tan is:

$$b = \cot\gamma_0 - \frac{1}{N^{1/2}\sin\gamma_0}, \quad (62)$$

where the initial flight path angle for a stage $\gamma_0$ is the ending flight path angle at burnout. The x-term, which is the $\alpha$-term in the linear phase combination, is equal to −1. This combination adds $\pi$ to the a tan function to correct the sign.

The result provided the correct range in a real, positive answer. This leads to the following correction when the terms are gathered to the orbital equation from eqn. (30) for arc range:

$$\theta_k = \frac{\pi}{2} - \arctan\left(-\cot\gamma_0 + \frac{1}{N^{1/2}\sin\gamma_0}\right) = \frac{\pi}{2} - \arctan(-b). \quad (63)$$

These changes adjust the range equation in eqn. (59) to the following equation for practical ranges.

$$\theta_{LI} = \frac{1}{R_e}\left[\sum_{i=1}^{n}\left(R_{i-1(H)} + V_i\cos\gamma_i t_i + \frac{1}{2}a_i\cos\gamma_i t_i^2\right)\right] + \quad (64)$$

-continued $$\frac{\pi}{2} - \arctan\left[-\cot\gamma_{BO} + \frac{1}{\aleph^{1/2}\sin\gamma_{BO}}\right] +$$

$$\frac{1}{R_e}\left[\left|\frac{\cos\gamma_E}{2\sin\gamma_E}\right|\{(h_0 - h_1)(1 + \exp[-a_e e^{-h_1/H}])\} + \sum_{i=1}^{n}(h_{i-1} - h_i) \cdot (1 + \exp[a_e e^{-h_{i-1}/H} - a_e e^{-h_i/H}])\right].$$

Using eqn. (64) for determining burn-out angle and parameters in the Table in view 200, the estimated range for the V-2 missile is 325.7 km with a time of 365.1 seconds. This compares favorably with the stated maximum range of 320 km and a time of flight of approximately 325 seconds. The Table presents component symbols 210 in a column with values 220, units 230 and descriptions 240 alongside each associated component. These parameters include drag coefficient, reference area, mass consumption rate, initial and final masses, specific impulse and flight path angle.

The characteristic velocity, well understood in rocket propulsion as a measure of combustion performance, can be expressed as:

$$c^* = \frac{I_{sp} \cdot g}{c_F} = \frac{p_c A_t}{\dot{m}}, \qquad (65)$$

where $I_{sp}$ is specific impulse, $c_F$ is thrust coefficient, $p_c$ is combustion chamber pressure, $A_t$ is throat area of the exhaust nozzle and m is the mass flowrate.

*Rocket Propulsion Elements* by George P. Sutton (1949) provides quantitative values for the V-2 (pp. 27-32). These include chamber pressure of 220 psia (1.517 MPa), throat diameter 15.75 inches (0.40 m), oxygen flowrate of 152.5 lb/s (69.17 kg/s), fuel flowrate of 123.5 lb/s (56.0 kg/s) and sea-level thrust of 56,000 lbf (249.1 kN). This provides throat area of 0.1257 m² (194.8 in²) and mass flowrate of 161.17 kg/s (276.0 lb/s) to yield a characteristic velocity of 1522.9 m/s (4996.5 ft/s) and specific impulse of 203 s at sea level. As a comparison, the F-1 engine for the Saturn V booster had a specific impulse of 263 s at sea level, while the Space Shuttle Main Engine had a specific impulse of 366 s at sea level (and 452 s vacuum).

Multistage Solution—The single-stage, non-separator missile is a useful model for clearly deriving and proving the mathematical derivation. The formula would be relatively unusable without an expression for staged systems. The approach for utilizing the derivation for a staged boosting system is to adjust the starting parameters for each boosting stage to the burnout conditions of the previous stage. This is a logical extension of the derivation, one that proved to be a valid approach with testing.

The code used to verify the single stage, non-separating case was modified in order to test a two-stage missile with a separating payload. The missile is completely notional and provides a useful comparison for the estimator. Changes to the code required additional inputs per stage: $\dot{m}$, $m_0$, $m_f$ (flowrate, initial and final masses), $I_{sp}$, and $\gamma_{BOi}$. Variables added due to staging are: payload mass (for $\beta_m$), time for separation ($t_{sep}$), velocity change at separation ($V_{sep}$), and the constant of integration. The constant can be found by solving eqn. (41) for C, and populating the equation with known or estimated values. In addition to these variable changes, other variables also needed to be tabulated by stage: $t_{BO}$, $\xi$, $\Re$, $c^*$, and $\beta_s$.

This means there are some changes to the equations for the boost phase for eqns. (56), (57) and (58). This in turn affects eqn. (59). A different index will be used j to denote a staging interval as opposed to a boosting interval, designated as i. These changes start by re-writing eqn. (55) to account for staging. The ripple effect, however, changes the sub-equations to be boost stage specific. In the case of the re-entry changes with the $\beta_m$ term, one should note that the term must be calculated with the payload mass instead of the last burn-out mass and the payload $C_{Do}$.

The relation eqn. (55) changes minimally in substance, outside of the inclusion of the staging iteration for n staging intervals with m stages:

$$R_{ji} = R_{j,i-1} + V_{j,i}t_i + \frac{1}{2}a_{j,i}t_i^2 \qquad (66)$$

Note that the j index denotes conditions at that stage at the start. Each stage builds on the previous stage. The time does not have a staging interval. This is due to the accelerations being based on the current stage engine timing, even though the properties of the stage are stage dependent. This nomenclature extends to the changes in eqns. (56), (57) and (58). The relation eqn. (58) is rewritten in eqn. (67) in order to provide the background for the changes as they apply to eqn. (64).

$$R_{BH} = \sum_{j=1}^{m}\sum_{i=1}^{n}\left(R_{j,i-1(H)} + V_{j,i}\cos\gamma_{j,i}t_i + \frac{1}{2}a_{j,i}\cos\gamma_{j,i}t_i^2\right) \qquad (67)$$

The $V_{j,i}$ term includes the initial velocity for that stage. The first stage has no initial velocity, and each subsequent stage has the previous stage burn-out velocity plus any inter-staging induced velocity. This combined velocity should be added to the starting velocity for the next stage or payload. The relation eqn. (66) also includes the flight path angle γ, while eqn. (54) describes the method to estimate the flight path angle. In the case of eqn. (67), the initial flight path angle for a stage $\gamma_0$ is the ending flight path angle for the previous stage. The remaining flight path angle $\gamma_R$ is the difference between the planned flight path angle for the stage and the initial condition at the start of the stage. This relation then calculates the flight path angle change from the start of the stage to the end, arriving at the desired value.

Modifications are also necessary to the time estimation in eqn. (60). The total burnout time in that equation is represented by $t_{BO}$. However, the calculation must be a summation of all of the burn-out times per stage plus the inter-stage intervals instead of merely a single stage, as provided below. The separation time $t_{int}$ is the time at the end of the current stage between the boosting events (e.g., staging interval). The change to the $t_{BO}$ term to $t_{BO,m}$ denotes the final total.

$$t_{BO,m} = \sum_{j=1}^{m}t_{int,j} + \frac{m_{0,j} - m_{P,j}}{\dot{m}_j} \qquad (68)$$

The form of eqn. (68) isn't a large departure from the original eqn. (35), and easy to incorporate. One last consideration is necessary with the velocity used for the orbital and re-entry stages of flight. The payload might have a velocity change due to its separation, and that would need to be included prior to calculating those portions of the equation. The changes in these relations alter eqn. (64) to be written as a multi-stage solution:

$$\theta_{LI} = \frac{1}{R_\theta} \left\{ \sum_{j=1}^{m} \sum_{i=1}^{n} \left[ R_{j,i-1(H)} + V_{j,i} \cos\gamma_{j,i}\, t_i + \frac{1}{2} a_{j,i} \cos\gamma_{j,i} t_i^2 \right] + \right. \tag{69}$$
$$\frac{\pi}{2} - \arctan\left( -\cot\gamma_{BO} + \frac{1}{\aleph^{1/2} \sin\gamma_{BO}} \right) +$$
$$\frac{1}{R_\theta} \left\{ \left| \frac{\cos\gamma_E}{2\sin\gamma_E} \right| \left[ (h_0 - h_1) \cdot (1 + \exp(-a_e e^{-h_1/H})) + \right. \right.$$
$$\left. \left. \left. \sum_{i=2}^{n} (h_{i-1} - h_i) \cdot (1 + \exp(a_e e^{-h_{i-1}/H} - a_e e^{-h_i/H})) \right] \right\} \right\}.$$

Likewise eqn. (60) becomes, including eqn. (68) instead of $t_{BO}$ is:

$$T_{LI} = \sum_{j=1}^{m} \left( t_{int,j} + \frac{m_{0,j} - m_{p,j}}{\dot{m}_j} \right) + \tag{70}$$
$$\frac{r_{BO}}{V_{BO} \cos\gamma_{BO}} \left\{ \frac{\tan\gamma_{BO}(1 - \cos\theta_k) + (1 - \lambda)\sin\theta_k}{(2 - \lambda) \cdot \left[ \frac{1 - \cos\theta_k}{\lambda(\cos\gamma_{BO})^2} + \frac{\cos(\theta_k + \gamma_{BO})}{\cos\gamma_{BO}} \right]} \right\} +$$
$$\left\{ \frac{2 r_{BO}}{V_0 \left( \frac{2}{\lambda} - 1 \right)^{3/2}} \tan^{-1} \left[ \frac{\left( \frac{2}{\lambda} - 1 \right)^{1/2}}{\cos\gamma_{BO} \cos\left( \frac{\theta_k}{2} \right) - \sin\gamma_{BO}} \right] \right\} +$$
$$\sum_{i=1}^{n} \frac{h_{i-1} - h_i}{v_{i-1} \sin\gamma_E},$$

where $r_{BO}$ and $V_{BO}$ represent radius and velocity at burnout.

One can note a few assumptions that potentially influence the accuracy. The first is that the final multi-stage boosting height will likely be calculated above the assumed 120,000 m atmosphere. The orbital portion assumes that the ending conditions are around that altitude and calculates the range accordingly. This causes the orbital calculations to be shorter than appropriate. Secondly, the boosting flight path angle assumes a constant rate of change, which is not always applicable for boosting missiles. Some discernment is necessary as the farther away the system is from that condition, the more incorrect the estimate. It would be appropriate to re-derive the flight path relation eqn. (54), using that equation should be considered. Lastly the re-entry calculation assumes a steep descent. Depressed trajectories at high velocity can cause these estimates to stray considerably from what is expected, increasing the range for that portion of flight.

FIG. 3 shows a flowchart view 300 of the software used to calculate the closed form result. The process begins 310 and proceeds to a read operation 315 of input variables followed by a first calculation operation 320 to determine constants. A solution operation 325 provides values for the calculation operation 320, which continues to an interval decision 330 with boost interval counts 335. While the intervals continue, a second calculation operation 340 determines velocity profiles, ground ranges, etc. When the counts are complete, a third calculating operation 345 determines burnout parameters, followed by a fourth calculation operation 350 to determine constants from burnout. The process continues to a fifth calculation operation to determine orbital range 355.

A re-entry intervals query 360 determines whether re-entry has completed. While ongoing, the process goes to a sixth calculation operation 365 to determine velocity profiles and re-entry ranges. Otherwise, a first summation operation 370 determines summations on orbital re-entry ranges, followed by a second summation operation 375 to determine flight time. The process then terminates 380.

Obtaining component values for solve operation 325 can be accomplished by evaluating the component relations: eqns. (18) for gravitational parameter, (1) for density, (5) for ballistic coefficient at reentry, (50) for ballistic coefficient at boost, (65) for characteristic velocity, (52) for drag acceleration, (39) for acceleration due to thrust, (42) for acceleration due to gravitation, (53) for linearized cumulative acceleration, (41) for height at the time increment, (33) for propellant mass ratio, (34) for payload ratio, (35) for burnout time, and (56) for the range interval for single stage missiles. Multiple stage systems require the range equation in (66) and the timing equation in (67). Note that multi-stage equations (66) and (67) simplify to equations (56) and (35) for the range and time equations for a single stage respectively.

Determining orbital range and time for operations 355 can be accomplished through the range relation as eqn. (30), and the time relation as eqn. (31) for all missiles. Determining reentry range and time for operation 365 can be accomplished through the range relation as eqn. (12), and the time relation as eqn. (3).

The solution for range in terms of burn-out conditions is outlined and the mathematical derivation steps through for each flight mode. This disclosure combines the efforts of previous derivations for orbital and re-entry calculations with subsequent exemplary efforts relating to boost phase. The solutions compare favorably with a known system and provide usable range estimates for ballistic missiles.

The exemplary algorithm contributes to the control system for a missile. Conventional control systems have a large dataset from detailed scenario executions. The control program selects a scenario from the dataset in order to determine the flight parameters of the missile to be guided. If that information isn't sufficient or the scenarios lack a path back to the expected parameters, the system cannot calculate a correcting solution, so the missile then generally self-destructs.

Hence in some cases, the system must have a window at the beginning to determine the path needed (pre-planning) and select missile controls to ensure the solution stays within a valid window. The exemplary algorithm provides two aspects: The first aspect is the pre-planning stage (prior to launch) to quickly calculate the necessary solution. The second aspect is in flight correction when outside the bounds of the window. Conventionally, this isn't possible as there is no conventional manner to calculate what happens at the end of the boost if the missile is outside the window's parameters.

To reiterate, the exemplary process constitutes part of the preplanning system to reduce the time to launch and to expand available launch parameter variability (time of flight, range at the end of boost, etc.) to enable launch under less narrow conditions than conventionally available. The exemplary process would also be part of a retaliatory missile control system where a computer needs to reevaluate due to some unexpected occurrence (wind, lower than expected thrust, etc.) to reach the mission's goal (e.g., the retaliatory missile reaching its target of the attacking missile's launch site). The first aspect is an improvement, the second aspect is a novel capability that doesn't conventionally exist outside of fairly narrow parameters of pre-calculated parameters.

Acknowledgments—two individuals deserve special appreciation: Jillian Hannah who was very helpful in mathematical verification and for her excellent proofreading skills, and Dr David Chichka who aided in determining the path forward when dealing with the complexities of the boosting stage through discussions and mathematical approaches.

While certain features of the embodiments of the invention have been illustrated as described herein, many modifications, substitutions, changes and equivalents will now occur to those skilled in the art. It is, therefore, to be understood that the appended claims are intended to cover all such modifications and changes as fall within the true spirit of the embodiments.

What is claimed is:

1. A computer-implemented analysis method for determining range of a ballistic missile for inclusion into a retaliatory targeting system, said method comprising:
   receiving and, initializing input variables of the missile;
   calculating constants from the missile;
   determining first completion of boost interval calculations;
   determining burnout parameters: burnout velocity, burnout flight path angle, and ground range at said first completion of said boost interval calculations;
   calculating orbital range from said burnout parameters;
   determining reentry intervals with which to incrementally calculate reentry velocity and reentry range until second completion of reentry interval calculations;
   calculating range values for boost, orbital and reentry;
   summing said boost, orbital, and reentry range values upon said second completion of said reentry interval calculations as a third completion of range summation;
   calculating flight times for boost, orbital and reentry from respective said velocity and range values;
   summing said boost, orbital, and reentry flight times upon said second completion of said reentry interval calculations as a flight time summation; and
   applying said range and flight time summations into the targeting system to determine the missile's launch site.

2. The method according to claim 1, wherein determining burnout parameters includes calculating:
   gravitational parameter $\mu = gR_e^2$ based on circular earth's radius $R_e$ and gravitational acceleration g;
   air density
   $$\rho = \rho_0 e^{\frac{-h_i}{H}}$$
   based on reference values including scale height H, where $h_i$ is local altitude and $\rho_0$ is sea-level air density at 1.752 kg/m³;
   burnout flight path angle at maximum range
   $$\gamma_{BO}^* = \frac{\pi}{4} - \frac{\theta_k}{4}$$
   from subtended arc range subtended angle $\theta_k$;
   scale ballistic coefficient at boost
   $$\beta_s = \frac{m_0 e^{-\frac{V_H + g\frac{2H}{V_H}}{c^*}}}{C_D S},$$
   where $m_0$ is initial mass, $V_H$ is vertical scale velocity for the vehicle, $C_D$ is drag coefficient and S is reference area, and such that;
   characteristic velocity to determine combustion performance of a rocket that propels the missile
   $$c^* = \frac{p_c A_t}{\dot{m}},$$
   where $p_c$ is combustion pressure, $A_t$ is exit, throat area and $\dot{m}$ is mass flow rate of propellant mass consumed per unit time;
   drag acceleration
   $$a_{D_i} = \frac{\rho_0}{2\beta_s} e^{-h_i/H} V_i^2,$$
   where $\beta_s$ is boost ballistic coefficient, and $V_i$ is increment velocity;
   boost gravitational term
   $$a_{g_i} = -\frac{1}{2} g t^2,$$
   where t is time;
   thrust and atmospheric acceleration losses
   $$a_{R_i} = \frac{\left(\frac{c^*\xi}{t_{BO}}\right)}{1 - \xi\left(\frac{t_i}{t_{BO}}\right)} \{1 - l_R e^{-h_i/H}\},$$
   where $\xi$ is mass ratio of structure and payload, $t_{BO}$ is total burn time, $t_i$ is time interval, and $l_R$ is loss variable;
   linearized acceleration at increment $\alpha_i = \alpha_{R_i} + \alpha_{g_i} \sin \gamma_i - \alpha_{D_i}$, where $\alpha_{R_i}$ is thrust acceleration, $\alpha_{g_i}$ is gravitational acceleration at boost, $\gamma_i$ is flight path angle, and $\alpha_{D_i}$ is drag acceleration;
   altitude
   $$h_i = V_0 t - \frac{1}{2} g t^2 + c^* \left[ -\frac{m_0 - \dot{m}t}{\dot{m}} \left( \ln \frac{m_0}{m_0 - \dot{m}t} + 1 \right) + C \right]$$
   for increment i, where $V_0$ is burnout velocity of the vehicle and C is an integration constant;
   mass ratio $\mathfrak{R}$ of usable propellant mass ratio $\xi$ of structure and payload, and burnout time $t_{BO}$ are
   $$\mathfrak{R} = \frac{m_p}{m_0}, \xi = 1 - \mathfrak{R}, t_{BO} = \frac{m_0 - m_p}{\dot{m}},$$

where $m_p$ is propellant mass; and horizontal range increment $$R_{iH} = R_{i-1(H)} + V_i\cos\gamma_i t_i + \frac{1}{2}a_i\cos\gamma_i t_i^2,$$

where $R_{i-1(H)}$ is horizontal range for previous increment.

3. The method according to claim 1, wherein calculating orbital range includes calculating:

arc range subtended angle $$\theta_k = \frac{\pi}{2} - \arctan\left(-\cot\gamma_0 + \frac{1}{\aleph^{1/2}\sin\gamma_0}\right),$$

where $\gamma_0$ is end-of-boost flight, path angle, and $\aleph$ is a trigonometric function of burnout velocity and initial altitude;

$$t_k = \frac{r_0}{V_0\cos\gamma_{BO}}\left[\frac{\tan\gamma_{BO}(1-\cos\theta_k) + (1-\lambda)\sin\theta_k}{(2-\lambda)\left\{\frac{1-\cos\theta_k}{\lambda\cos^2\gamma_{BO}} + \frac{\cos(\theta_k+\gamma_{BO})}{\cos\gamma_{BO}}\right\}}\right] +$$

range time $\left[\frac{2r_0}{V_0\lambda\left(\frac{2}{\lambda}-1\right)^{3/2}}\tan^{-1}\left(\frac{\left(\frac{2}{\lambda}-1\right)^{1/2}}{\cos\gamma_{BO}\cot\left(\frac{\theta_k}{2}\right) - \sin\gamma_{BO}}\right)\right],$ where $r_0$ is radius and $$\lambda = \frac{V_0^2}{\mu/r_0}$$

is inertial parameter.

4. The method according to claim 1, wherein calculating reentry intervals includes calculating for each increment i:

reentry time $$t_{RE} = \sum_{i=1}^{n}\frac{h_{i-1}-h_n}{V_{i-1}\sin\gamma_E},$$

where $h_{i-1}$ is altitude at previous increment, $h_n$ is atmosphere layer, $V_{i-1}$ is vehicle velocity for said previous increment, and $\gamma_E$ is reentry angle, and reentry range $$R_{RE} = \left|\frac{\cos\gamma_E}{2\sin\gamma_E}\right|\cdot\left[(h_0-h_1)\{1+\exp[-a_e e^{-h_i/H}]\} + \sum_{i=2}^{n}(h_{i-1}-h_i)\{1+\exp[a_e e^{-h_{i-1}/H} - a_e e^{-h_i/H}]\}\right],$$

where $h_0$ is initial altitude and $\alpha_e$ is velocity decay coefficient.

\* \* \* \* \*